United States Patent [19]

Wadleigh

[11] Patent Number: 5,271,287
[45] Date of Patent: Dec. 21, 1993

[54] MULTI-METAL COMPOSITE GEAR/SHAFT

[75] Inventor: Albert S. Wadleigh, Torrance, Calif.

[73] Assignee: Materials Analysis, Inc., Dallas, Tex.

[21] Appl. No.: 920,976

[22] Filed: Jul. 28, 1992

[51] Int. Cl.[5] ............................................. F16H 55/12
[52] U.S. Cl. ........................................ 74/439; 74/446; 474/152
[58] Field of Search ............................ 29/893, 893.1; 74/421 R, 439, 446, 460; 474/152, 900, 901, 902, 903

[56] References Cited

U.S. PATENT DOCUMENTS

| | | | |
|---|---|---|---|
| 479,233 | 7/1892 | Walker | 74/439 X |
| 1,412,706 | 4/1922 | Pearce | 74/460 |
| 2,231,427 | 2/1941 | Larsh et al. | 74/446 X |
| 3,557,423 | 1/1971 | Wolfe et al. | 29/159.2 |
| 3,597,832 | 8/1971 | Calton | 29/470.3 |
| 3,629,932 | 12/1971 | Richter | 29/472.1 |
| 3,693,238 | 9/1972 | Hoch et al. | 29/470.3 |
| 3,798,011 | 3/1974 | Sharp, Jr. | 29/197 |
| 4,964,564 | 12/1990 | Neal et al. | 228/107 |
| 5,054,980 | 10/1991 | Bidefeld | 411/171 |

FOREIGN PATENT DOCUMENTS

| | | | |
|---|---|---|---|
| 326176 | 9/1920 | Fed. Rep. of Germany | 74/446 |
| 203251 | 10/1983 | Fed. Rep. of Germany | 29/893 |

Primary Examiner—Leslie A. Braun
Assistant Examiner—David W. Laub

[57] ABSTRACT

The invention is directed to a method and a product produced by the method where in there is created a multi-metal composite object that takes on the configuration of a shaft which would include in combination an outer annular element having an outer cylindrical surface and an inner frusto conical annular metal element of a dissimilar metal. The inner frusto conical annular metal element of dissimilar metal includes an inner mating frusto conical surface bonded to a mating outer frusto conical surface of another metal element to thereby provide a multi-metal element composite shaft The composite object in a preferred embodiment of the invention takes the form of a multi-metal element composite gear, web and shaft that includes a steel outer annular gear toothed element, an inner aluminum element and a titanium element that provides a gear web and shaft.

4 Claims, 3 Drawing Sheets

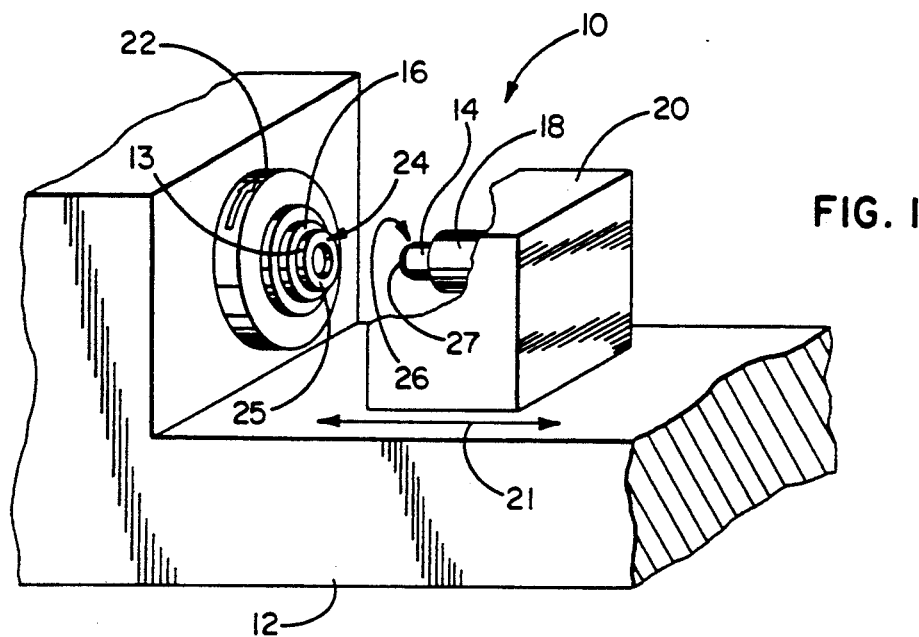
FIG. 1
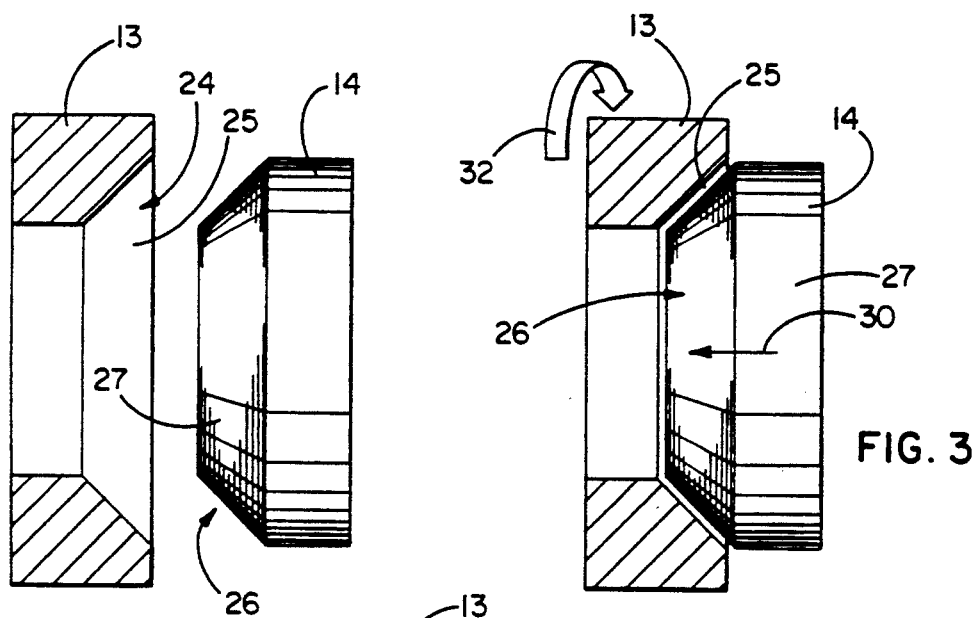
FIG. 2
FIG. 3
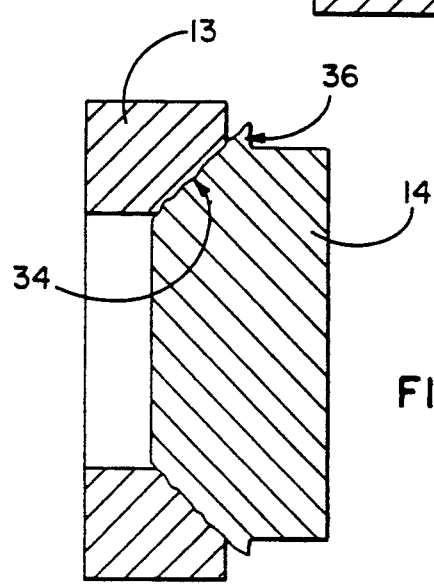
FIG. 4

MULTI-METAL COMPOSITE GEAR/SHAFT

TECHNICAL FIELD

This invention relates to a method and a product produced by the method wherein a multi-metal composite structure is brought into existence. More specifically the invention is directed to a method of making a multi-metal composite shaft that can be further fashioned into a gear wherein gear teeth are of one type of metal and the gear has a web and gear shaft or hub comprised of another metal.

BACKGROUND ART

Composite metal structures of all kinds have great appeal in almost all fields of technology as these structures are capable of providing overall physical property characteristics frequently not found in a given metal or alloy thereof. It is not surprising to find there are uses for metal structures that call for metal surfaces of the structure that require hard surfaces for wear, contact fatigue and bending fatigue, while another portion of the structure has lower service stress requirements but does require toughness and sheer strength to, for example, transmit torque. Gear teeth, splines and bearing races are examples of metal surfaces of the character noted above, whereas lower service stress requirements are found in gear web and gear shaft portions.

Historically, carburized, nitrided, or carbonitrided alloy steels have been used for the manufacture of virtually all aircraft gears and gear shafts. Typically carburized alloy 9310 has been the material of choice.

Driven by an ever present need to continuously reduce the weight of all parts of an aircraft while maintaining structural integrity it is no surprise that the aircraft industry has pressed for the creation of lighter weight high strength gears for use in aircraft environment. It is well recognized that every ounce of weight that can be removed from an aircraft will pay large dividends in the way of fuel savings over the life of the aircraft, which life frequently exceeds twenty years.

To meet the need for a light weight high strength gear as defined above it has been suggested that steel toothed gears with titanium webs and shafts be employed to meet the need. Accordingly it has been recognized that a composite gear with steel teeth and titanium web or shaft would provide the desired weight reduction, however, to date there have been no reliable methods of welding titanium directly to steel on a production basis due to metallurgical incompatibilities.

This is not to say that others have not tried their hand at creating composite structures that have included steel and titanium. In this regard attention is directed to the W. F. Sharp, Jr. U.S. Pat. No. 3,798,011('011) which describes a multilayered metal composite that finds utility in transition joints. The '011 patent identifies a variety of metals that may be fashioned into layers and includes among such metals iron (Fe), aluminum (Al), and titanium (Ti) and further notes that where metals of an interlayer and outer layer together form a ductile alloy, the bond between layers may be prepared for example, by roll bonding, inertia (i.e. friction) welding, flash-but welding, or by explosion bonding.

While the '011 patent makes publicly available the ideas that a composites plate of Fe,Al and Ti is obtainable and that friction welding of ductile metal layers are a way to bond layers together, the 1011 patent offers no suggestions relevant to the method of the instant invention which brings into existence a composite multi-metal steel gear having a titanium gear web and shaft.

A method for manufacturing an improved composite gear having a steel hub and bronze gear teeth is shown and described in the R. L. Wolfe et al U.S. Pat. No. 3,557,423('423). The steel hub and a bronze annulus containing the gear teeth are joined by solder.

While the '423 patent teaches the concept of a composite metal gear there is no suggestion of a multi-metal gear/shaft of the nature of the subject invention to be described more fully hereinafter.

Another composite metal gear is described but not shown is the Neal et al U.S. Pat. No. 4,964,564('564). In the "Background of Invention" Section of the '564 patent it is indicated that the invention of the '564 patent may be employed in the manufacture of gears where the teeth are required to be made of titanium or light alloy to reduce the rotating mass. It is noted, however, that no where in the balance of the '564 patent specification and claims is there any further mention of how the invention is incorporated in the manufacture of composite steel/titanium gears. The patent drawings and specification do describe the joining of two bodies together by means of an interlayer of a different material where surfaces of the two bodies to be joined are provided with mating corrugated configurations.

The bonding of steel and titanium directly to each other without the presence of an intermediary layer of material is shown and described in U.S. Pat. No. 3,629,932('932) and 5,054,980('980). In the '932 patent a titanium plate is driven by an explosive force against a steel plate to create a composite metal sheet. In the '980 patent a titanium plate is secured to a carbon steel plate by means of a titanium stud that includes an internal steel friction weldable nose that bonds to the steel plate through an opening therein. The titanium stud is then friction welded to the titanium plate. The steel to titanium composite methods of the '932 and '980 patents appear to represent the state of the art and do not suggest the novel multi-metal composite structure present in the gear/shaft structure embodying the invention as defined hereinafter.

A process for the inertia welding of steel to aluminum is described in the Marion Calton U.S. Pat. No. 3,597,832('832). The process of the '832 patent utilizes a conical projection on an aluminum workpiece that is brought into frictional contact at the center of a steel workpiece. As the conical projection is rotated and increased pressure is applied to bring the conical projection against the steel workpiece a friction weld of the aluminum to the steel is accomplished.

In the Hoch et al U.S. Pat. No. 3,693,238('238) there is described a method of joining together an aluminum workpiece and a ferrous workpiece by relative rotation of the workpieces while the workpieces are forced together at mutually engaging parallel, planar surfaces.

The '832 and '238 patents described above are believed to represent the state of the art with respect to the friction bonding of aluminum to steel and do not suggest the process of the instant invention which produces a multi-metal composite gear/shaft.

SUMMARY OF THE INVENTION

In accordance with the method of the present invention, in its broadest sense, there is provided a multi-metal composite object and more particularly the multi-metal composite object takes a final form as a gear or shaft.

The method includes the steps of bringing mating surfaces of first and second dissimilar metal elements into frictional engagement with a force and for a time sufficient to generate heat at the mating surfaces to raise the temperature of at least one of the mating surfaces to the upper end of its forging temperature range to thereby bond the dissimilar metal elements together. This step is followed by the removal of a portion of one of the metal elements to thereby leave a residual portion of one metal element bonded to the other metal element. The residual portion of the one metal element has another mating surface created by the removal of the portion of the metal element noted above. A third and final step calls for the bringing of a mating surface of a third metal element into frictional engagement with the other mating surface of the residual portion of the one metal element with a force and for a time sufficient to generate heat sufficient to raise the temperature of at least one of the mating metal surfaces of the residual portion and the other metal element to the upper end of its forging temperature range to thereby bond the other metal element to the first and second dissimilar metal elements and create a multi-metal element composite object.

The composite object in its most generic form would take on the configuration of a shaft which would include in combination an outer annular element having an outer cylindrical surface and an inner frusto conical annular metal element of a dissimilar metal. The inner frusto conical annular metal element of dissimilar metal includes an inner mating frusto conical surface bonded to a mating outer frusto conical surface of another metal element to thereby provide a multi-metal element composite shaft.

The composite object in the preferred embodiment of the invention takes the form of a multi-metal element composite gear, web and shaft that includes a steel outer annular gear toothed element which has an inner frusto conical surface bonded to a mating outer surface of a frusto conical annular aluminum element.

The inner frusto conical annular aluminum element is provided with an inner mating frusto conical surface bonded to a mating outer frusto conical surface of a titanium element.

The titanium element provides a gear web portion integral and contiguous with the mating outer frusto conical surface of the inner mating surface of the aluminum annular element. The titanium element also includes a shaft portion integral and contiguous with the gear web portion to thereby provide a multi-metal steel, aluminum and titanium composite gear, web, and shaft.

BRIEF DESCRIPTION OF THE DRAWINGS

FIG. 1 is a three dimensional partial view of one embodiment of a friction or inertia welding machine which may be utilized to practice the method of the present invention;

FIG. 2 is a partial cross-sectional view of a pair of dissimilar metal element workpieces;

FIG. 3 is a partial cross-sectional view illustrating a pair of dissimilar metal element workpieces positioned just prior to frictional engagement of frusto conical surfaces of the workpieces;

FIG. 4 is a cross-sectional view of a friction weld bond of dissimilar metal workpieces;

FIG. 11 to 15 illustrate another embodiment of the invention wherein FIG. 11 is a partial cross-sectional view illustrating a pair dissimilar metal element workpieces positioned just prior to frictional engagement of frusto conical surfaces of the workpieces;

FIG. 12 is a partial sectional view of a friction weld bond of dissimilar metal workpieces;

FIG. 13 is sectional view of the friction weld bonded workpieces of FIG. 12 with a portion of a workpiece removed and another metal workpiece positioned adjacent the bonded workpieces;

FIG. 14 is a cross-section of a gear blank embodying the invention, and

FIG. 15 is a cross-section of a multi-metal composite gear embodying the invention.

DETAILED DESCRIPTION OF THE DRAWINGS

Figure 5:
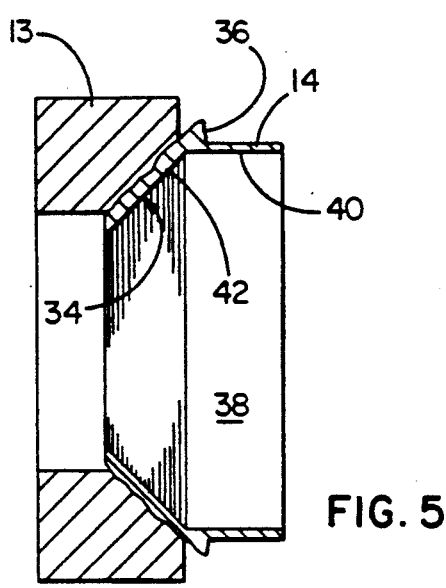
FIG. 5 is a cross-sectional view of the friction weld bond of dissimilar metal workpieces of FIG. 4 with a portion of one of the metal workpieces removed.

Reference is now made to FIG. 1 which illustrates a three dimensional partial view of an inertia welding machine 10 of the type that may be utilized to practice the method of the present invention.

The machine comprises a housing 12 in which various components of the machine are housed. A more detailed description of this type of machine may be found by making reference to U.S. Pat. No. 3,597,832 where details and operation of additional components of this type of machine are set forth. First and second metal element workpieces 13, 14 are shown mounted in chucks 16 and 18.

The chuck 18 does not rotate and is mounted on a tailstock fixture 20. The fixture 20 is moved by a mechanism not shown. This mechanism determines the axial force with which the workpiece metal elements 13 and 14 are engaged.

The chuck 16 is mounted on a spindle, not shown, for rotation therewith. A flywheel 22 is also mounted for rotation with the spindle just noted. The flywheel 22 may be of a various size and mass depending upon the characteristics of the metal element workpieces. A motor, not shown, within the housing 12 drives the spindle through a transmission, also not shown.

Before a detailed description of the metal element workpieces 13 and 14 are described, the general operation of the inertia welding machine 12 will be described.

After the first and second metal element workpieces 13 and 14 have been properly machined and cleaned in a manner to be described hereinafter and then chucked respectively in chucks 16 and 18, the flywheel 22, chuck 16 and first metal element workpiece 13 begins to rotate under the influence of the motor, transmission and spindle described earlier. The rotational speed of the spindle/chuck 16/flywheel 22/work piece 13 is a variable parameter which is selected for the individual weld. After the spindle/chuck 16/flywheel 22/workpiece 13 reaches a predetermined rotational speed the spindle is mechanically disconnected from the transmission/motor in the housing 12 by means not shown and allowed to free wheel with the rotational momentum provided principly by the mass of the flywheel 22. The mass of the flywheel 22 itself is variable and is selected based on the material and configuration of the components to be welded. While the flywheel 22 is rotating freely, the tailstock fixture 20 into which there is secured chuck 18 and second metal element workpiece 14 is chucked therein, the tailstock fixture 20 is forced toward the rotating first metal element workpiece 13 in a linear fashion by hydraulic pressure and mechanical means, not shown, but part of the inertia welding machine 10. The tailstock fixture 20 and associated second metal element workpiece 14 have a linear component of relative movement towards the first metal element workpiece 13, whereas the first metal element workpiece 13 because it is secured to the rotating flywheel 22 has a rotational component of relative movement with respect to the second metal element workpiece 14 secured in chuck 18 of the tailstock fixture 20. Because of the relative movements of the first and second metal element workpieces 13, 14, yet to be described mating surfaces of the respective workpieces are brought into frictional engagement. Accordingly, in a broad sense the first and second metal element workpieces 13, 14 include both a linear and rotational component of relative motion with respect to the mating surfaces.

It will be observed upon study of a right hand portion of the first metal element workpiece 13, as FIG. 1 is viewed, that the workpiece 13 is provided with a frusto conical shaped opening 24. It will also be observed upon a continued study of the same figure that the workpiece 14 is provided with a frusto conical shape end portion 26 which has a frusto conical mating surface 27 designed to frictionally engage a frusto conical mating surface 25 of the workpiece 13. The mating surfaces 25, 26 are brought into frictional engagement with a force and for a time sufficient to generate heat at the mating surfaces 25, 27 to raise the temperature of at least one of the mating surfaces to the upper end of its forging temperature range to thereby bond the first and second metal element workpieces 13, 14 together at the mating surfaces 25, 27. It is important to the practice of the instant invention that the aforementioned temperature not enter the melting range of either of the first or second metal element workpieces 13, 14.

In addition to creating heat and providing deformation during the presence of the forging temperature, at the mating interfaces 25, 26 the friction between the two components also brings the flywheel 22 to a stop. Thus the rotational energy of the flywheel 22 is transformed into thermal and strain energy which causes the two components to be welded together without either of the metal element workpieces changing to a liquid phase during the process.

The inertia welding process of the subject invention just described produces welds of rotational symmetry. The inertia weld machine settings, or weld parameters, which can be varied in the practice of the method are flywheel mass, spindle RPM, and weld force, which is the force with which the non-rotating second metal element workpiece compresses against the rotating first metal element workpiece during the welding process.

The term "friction welding" refers to a process which is similar to inertia welding except that in friction welding the spindle and flywheel do not free wheel during the welding process but rather are driven in some preprogrammed manner. All other aspects of the welding process are the same. The subject invention encompasses both inertia and friction welding.

Turning now to a specific description of a preferred embodiment of the invention, attention is directed to FIGS. 2 through 10 inclusive.

As noted at the outset of the specification there has been a need to reduce the weight of all aircraft hardware to thereby reduce fuel costs attendant to keeping aircraft aloft, increasing fuel efficiency and aircraft speed. In this regard it has long been desired to reduce the weight of the many gears employed throughout an aircraft especially those gears that are subjected to heavy loads and are by the nature of their service the heaviest and strongest. The desirability of a steel gear having a light weight titanium web and shaft portions has long been stated. The problem keeping this combination of metals from use in a gear has been the inherent difficulty of bonding steel to titanium due to metallurgical incompatibilities. Typically aircraft gears and gear shafts are made of carburized alloy 9310.

Although titanium can not be welded directly to steel, it has been known that 6061 aluminum could be welded to Ti-6Al-4V and that 6061 aluminum could also be welded to alloy steels.

The inventive process of creating a tri-metal gear involving two separate welding operations will now be described.

FIG. 2 illustrates in cross-section the first metal element workpiece 13 described earlier as being securely mounted in chuck 16, portions of the frusto conical shaped opening 24 and frusto conical mating surface 25 are also shown. Depicted to the right of the first metal element workpiece 13, shown in a full side view is the second metal element workpiece 14 with its frusto conical shaped end portion 26 and frusto conical shaped mating surface 25.

The first metal element workpiece 13 and the second metal element workpiece 14 are made of dissimilar metals. In the preferred embodiment, workpiece 13 is made of alloy 9310 steel and workpiece 14 is made of 6061 aluminum.

FIG. 3 shows the frusto conical shaped end portion 26 and its related mating surface 25 being brought into the frusto conical opening 24 of the first metal element workpiece opening 24 as indicated by linear motion component arrow 30. A rotational motion component arrow 32 is intended to indicate that the first metal element workpiece 13 is rotating. The mating surfaces 25, 26 may also be described as frustums of female and male cones respectively. In the prior art it appears that most inertia and friction welds are butt welds wherein the mating surfaces are perpendicular to the axis of rotation of the spindle.

FIG. 4 illustrates in section the first metal element workpiece 13 welded to the second metal element workpiece 14 at weld region 34. In the preferred embodiment shown here the first metal element workpiece 13 is steel and the second metal element workpiece 14 is aluminum. In this embodiment the aluminum is the metal that reaches the upper end of its forging temperature range before the steel does the same and is therefore a critical parameter in setting the inertia weld machines other variable parameters noted earlier.

During the welding process and as a result of the deformation of the aluminum, some aluminum becomes extruded as is indicated by, reference numeral 36 and associated arrow.

The results of the next step of the method are shown in FIG. 5, where a portion of the aluminum metal element 14 has been removed leaving a cavity 38 with an internal cylindrical surface 40, as well as, an internal frusto conical mating surface 42. In order to create the cavity 38 the inertia friction welded first and second metal elements can be removed from the chucks 16, 18, FIG. 1 and the aluminum of the second workpiece 14 machined away in a conventional fashion.

Figure 6:
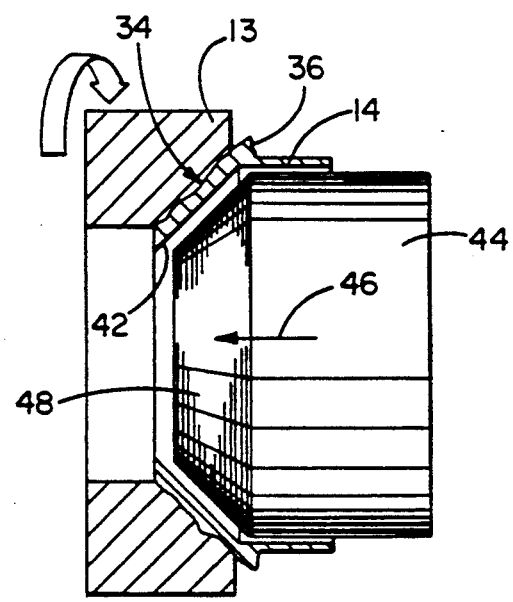
FIG. 6 is a partial-section of the friction weld bonded work pieces of FIG. 5 with a portion of a workpiece removed and another metal workpiece positioned within on of the workpieces.

FIG. 6 is a partial-section of the friction weld steel and aluminum workpieces 13, 14 with a portion of workpiece 14 removed, as just described and a titanium metal element workpiece 44 positioned within the cavity 38, see FIG. 5, of the aluminum element workpiece 14. The steel/aluminum workpiece 13, 14 may be secured in the rotatably mounted chuck 16, FIG. 1 and the titanium metal element workpiece 44 in chuck 18 of the tailstock 20 and advanced in the direction of arrow 46. The titanium metal element workpiece 44 is provided with a frusto conical mating surface 48 which will frictionally engage the inner frusto conical mating surface 42 brought into existence by the removal of a portion of the aluminum metal element workpiece 14. It will be recalled that the welded workpieces 13, 14 rotate whereas the titanium workpiece 44 is constrained to move in a linear fashion.

Figure 7:
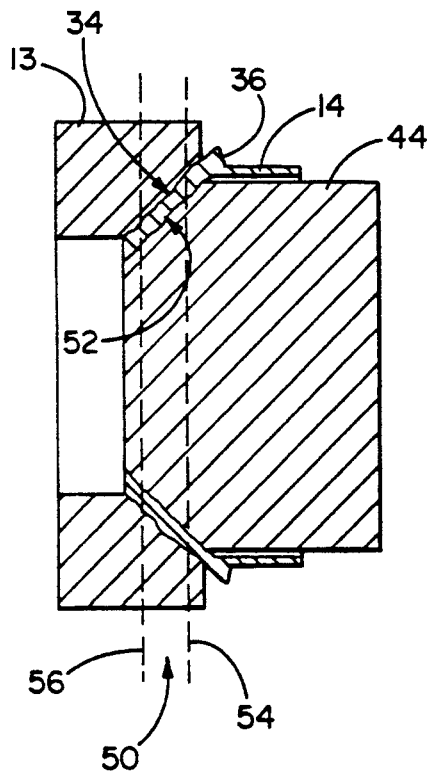
FIG. 7 is a cross-sectional view of a multi-metal composite object embodying the invention.

FIG. 7 depicts a cross-sectional view of a multi-metal i.e. steel, aluminum and titanium composite object 50 embodying the invention. The multi-metal composite object 50 includes two inertia welds, one of which involves the steel/aluminum weld region 34 and the other inertia weld involving the aluminum/titanium weld region 52.

Figures 8, 9:
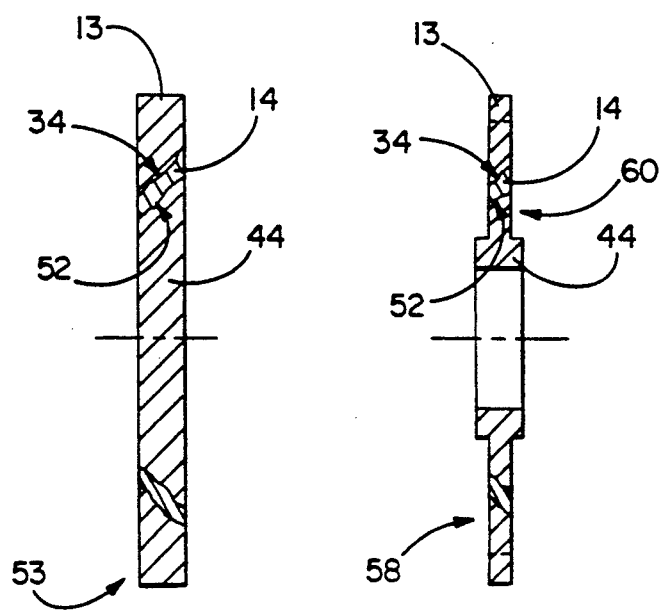
FIG. 8 is a cross-section of a shaft portion or gear blank embodying the invention.
FIG. 9 is a cross-section of a gear blank embodying the invention with portions of the gear blank removed to provide a shaft portion for the gear blank.

The creation of a multi-metal composite shaft of the nature shown in cross-section in FIG. 8 only requires machining away all multi-metal composite structure to the right of broken line 54, FIG. 7, and all multi-metal composite structure to the left of broken line 56.

Figure 10:
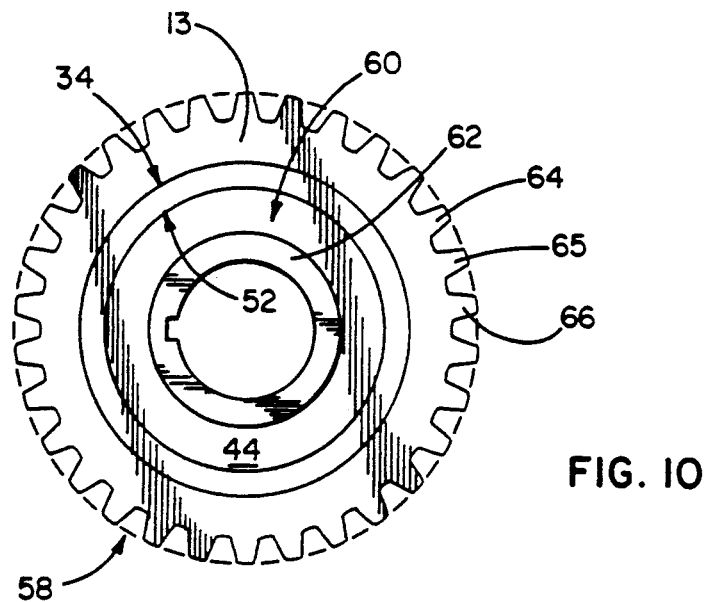
FIG. 10 is full view of a multi-metal composite gear embodying the invention.

FIGS. 9 and 10 when taken together present an understanding of the finished appearance of a multi-metal steel/aluminum/titanium composite gear embodying the invention. When axial ends of the shaft structure of FIG. 8 are machined away there is created the nearly finished composite gear structure of FIG. 9 in which there is shown a titanium gear web portion 60 and support shaft portion 62. Machining of gear teeth 64, 65, 66 for example in steel element 13 completed the creation of a composite metal gear embodying this invention.

Reference is now made to FIGS. 11 thru 15 which depict another physical embodiment of the invention. Reference numerals employed in the description of the structure shown in these figures will include a prime marking (1) after the reference numeral to indicate that the reference numeral has been used before. The numerical designation for the reference numerals will correspond in number to reference numerals employed earlier to designate similar items or features identified in FIGS. 1 to 10.

Figures 11, 12, 13:
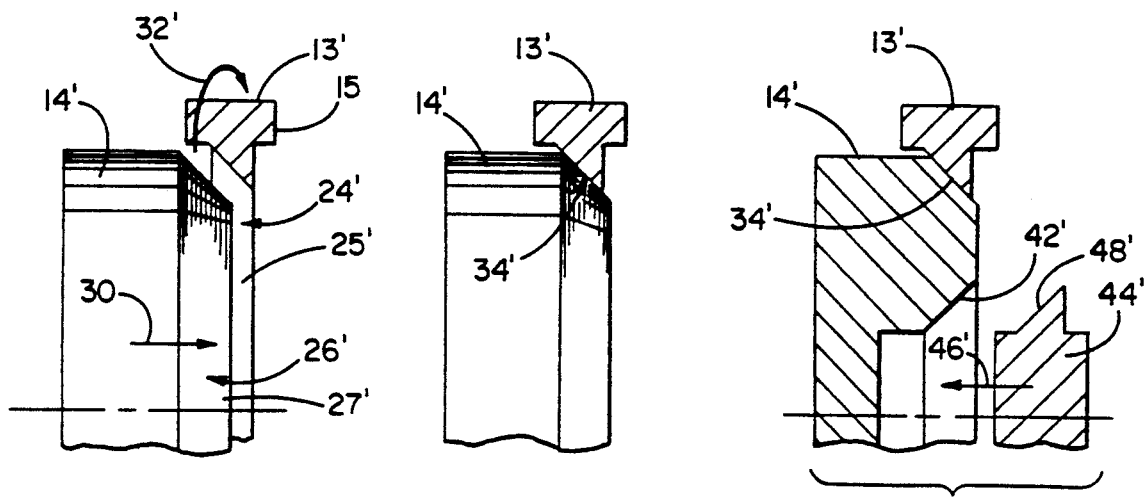
Figures 14, 15:
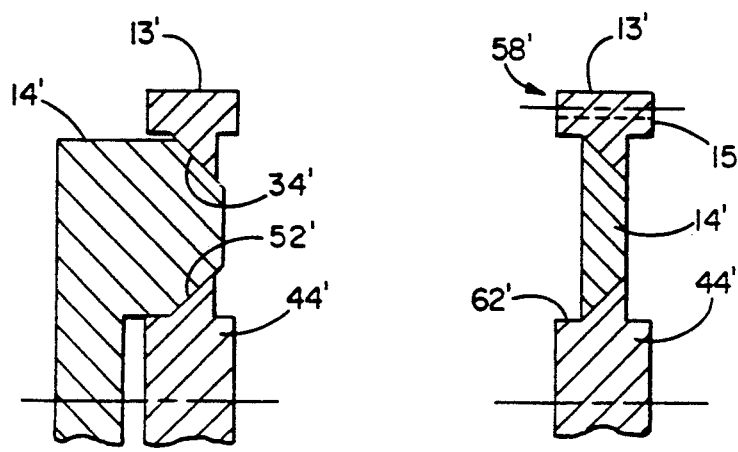

Accordingly, with specific reference to FIG. 11 there is shown a first metal element workpiece 13', the configuration of which differs from that depicted in the earlier figures in that the workpiece 13' has had its sides machined away to create an annular gear portion 15 into which gear teeth may be machined as indicated in FIG. 15. The second metal element workpiece 14' is shown moving in a linear manner as indicated in by arrow 30'.

The method step depicted in FIG. 12 corresponds to that depicted in FIG. 4. The removal of a portion of the second metal element workpiece 14' in FIG. 13 corresponds to the same method step depicted and described with respect to FIG. 5. Another metal element 44' corresponds to the metal element workpiece 44 of FIG. 6 whereas the inertia welded multi-metal object of FIG. 14 corresponds to that which is shown in FIG. 7.

In FIGS. 14 and 15 weld regions 34' and 52' correspond to weld regions 34, 52, of FIG. 7, 8, 9 and 10.

The multi-metal element composite gear 13', 15, web 14' and shaft, portion 44', 62' of FIG. 15 may fabricated of steel for the gear portion 15, aluminum for the web 14' and titanium for the shaft portion 62.

When the final product of the inventive method is reviewed it will be observed that the gear 58 of FIG. 10 as better seen in FIG. 9 has weld regions 34 and 52 and the corresponding mating surface 48, FIG. 6 are equidistant and congruent with each other where as the weld regions 34' and 52' and the corresponding mating surfaces 25' and 48' are in an opposed relationship as can be observed in FIG. 13.

Reference is now made to the finished gear 58 of FIG. 10 and more specifically to some of the details of construction of the preferred embodiment of the invention. In those situations where workpiece 13 is made of carburized alloy 9310 steel, the workpiece 14 is 6061 aluminum and the other metal 44 is Ti-6Al-4V, that which is next to be described has been discovered to be practical.

In FIG. 5 where there is shown a portion of the second metal element workpiece 14 removed, it has been determined that a satisfactory thickness of the second metal element workpiece 14 may range between 0.005" to 0.100" thick.

Metallurgical evaluation and mechanical torsion testing of tri-metal gear components, described next above, gave every indication that actual gears manufactured by the inventive method described herein before, could be expected to perform mechanically as well as conventional all steel gears with a weight reduction of around 25-30% depending upon the actual configuration of a specific gear being produced.

Test gears were manufactured by the method of the previously described invention and these test gears were then fatigue tested. The test gears were run under load at 10,000 rpm for 50 hours with a maximum contact stress of 261,000 psi. This is a relatively severe set of test conditions which was developed for all steel gears. After testing, these tri-metal gears showed no sign of pitting or other distress that would have prohibited continued testing.

It has been recognized that when aluminum is the metal employed as an interlayer, the multi-metal gear exhibits an obvious maximum use temperature some where around 300 degrees F. It is to be understood that the subject invention contemplates as falling within the purview of the claimed invention the use of different alloy materials for the interlayer. These alloys could include such metals as brasses and bronzes for the interlayer material.

Although this invention has been illustrated and described in connection with the embodiments described, it will be apparent to those skilled in the art that various changes may be made therein without departing from the spirit of the invention as set forth in the appended claims.

I claim:

1. A multi-metal element composite gear, web, and shaft including a combination.

an outer annular gear toothed element having an inner frusto conical surface bonded to a mating outer surface of an inner frusto conical annular metal element of a dissimilar metal, said inner frusto conical annular metal element having an inner mating frusto conical surface bonded to a mating outer frusto conical surface of another metal element, said another metal element having a gear web portion integral and contiguous with said mating outer frusto conical surface and a shaft portion integral and contiguous with said gear web portion.

2. The multi-metal element composite gear, web, and shaft of claim 1 wherein said bond between said inner frusto conical surface of said outer annular gear toothed element and said mating outer surface of said frusto conical annular metal element of dissimilar metal is an inertia weld.

3. The multi-metal element composite gear, web, and shaft of claim 2 wherein said outer annular gear toothed element is comprised of steel, said inner annular metal element is comprised of aluminum, and said other metal element forming said gear web and said shaft is comprised of titanium.

4. The multi-metal element composite gear, web, and shaft of claim 2 wherein said bond of said inner mating frusto conical surface of said annular metal element to said mating outer frusto conical surface of said other metal element is an inertia weld.

* * * * *